United States Patent
Heidt

(10) Patent No.: US 12,017,318 B1
(45) Date of Patent: Jun. 25, 2024

(54) ACCESSORY MOUNTING SYSTEM FOR CONNECTION TO A WORK COMPONENT HAVING AN ELONGATED T-SHAPED SLOT

(71) Applicant: TSO PRODUCTS, LLC, Eagan, MN (US)

(72) Inventor: William D. Heidt, Columbus, IN (US)

(73) Assignee: TSO Products, LLC, Eagan, MN (US)

( * ) Notice: Subject to any disclaimer, the term of this patent is extended or adjusted under 35 U.S.C. 154(b) by 0 days.

(21) Appl. No.: 18/311,090

(22) Filed: May 2, 2023

(51) Int. Cl.
   *B23Q 9/00* (2006.01)
   *B23Q 3/00* (2006.01)
   *B27B 9/04* (2006.01)

(52) U.S. Cl.
   CPC ........... *B23Q 9/0028* (2013.01); *B23Q 3/005* (2013.01); *B27B 9/04* (2013.01)

(58) Field of Classification Search
   CPC .... B23Q 9/0014; B23Q 9/0028; B23Q 3/005; B23Q 9/0042; Y10T 83/667; Y10T 83/68; Y10T 83/75; Y10T 83/7763; Y10T 83/8763; Y10T 29/50; Y10T 409/306384; Y10T 83/7726; Y10T 83/8878; B27B 9/04; B23D 47/02; B23D 59/00
   See application file for complete search history.

(56) References Cited

U.S. PATENT DOCUMENTS

| | | | |
|---|---|---|---|
| 4,674,620 A | 6/1987 | Inoue | |
| 5,582,376 A * | 12/1996 | Thompson | A47B 96/067 248/225.11 |
| 6,557,601 B1 | 5/2003 | Taylor | |
| 7,610,839 B1 | 11/2009 | Bessette | |
| 9,156,184 B2 | 10/2015 | Stoffel | |
| 10,363,681 B2 * | 7/2019 | Friedebach | B27B 9/04 |
| 10,843,368 B2 * | 11/2020 | Friedebach | B27B 9/04 |
| 10,875,109 B1 * | 12/2020 | Gibson | B27B 9/04 |
| 2003/0145705 A1 | 8/2003 | Miller | |
| 2003/0196532 A1 * | 10/2003 | Alsruhe | B27B 9/02 83/331 |
| 2006/0123962 A1 | 6/2006 | Fontaine | |
| 2010/0028592 A1 * | 2/2010 | Barkdoll | A47F 5/0846 52/506.01 |

(Continued)

FOREIGN PATENT DOCUMENTS

| | | | | |
|---|---|---|---|---|
| EP | 2974824 A2 * | 1/2016 | | B23D 47/02 |
| EP | 3599039 | 1/2020 | | |

*Primary Examiner* — Jonathan G Riley
(74) *Attorney, Agent, or Firm* — Cook Alex Ltd.

(57) ABSTRACT

An accessory mounting system for connection of an accessory to a work component having an elongated central opening to a T-shaped slot and a method of making such connection, the accessory mounting system including a generally planar body, a retention element connected to the body, a clamp assembly spaced from the retention element and being connected to the body, a first reference surface extending upward from the body and in a first direction and being located between the retention element and the clamp assembly, the retention element comprising a leg portion extending from an upper end of an upright portion, the clamp assembly having a portion extending toward the retention element and that moves the work component laterally relative to the first reference surface, wherein the retention element is sized to be received through the elongated central opening to the T-shaped slot in the work component.

24 Claims, 6 Drawing Sheets

(56) References Cited

U.S. PATENT DOCUMENTS

| | | |
|---|---|---|
| 2016/0201705 A1 | 7/2016 | Vidor |
| 2020/0023541 A1* | 1/2020 | Strempke ................ B27B 27/10 |
| 2021/0299905 A1* | 9/2021 | Wollenburg ............ B27B 27/10 |

* cited by examiner

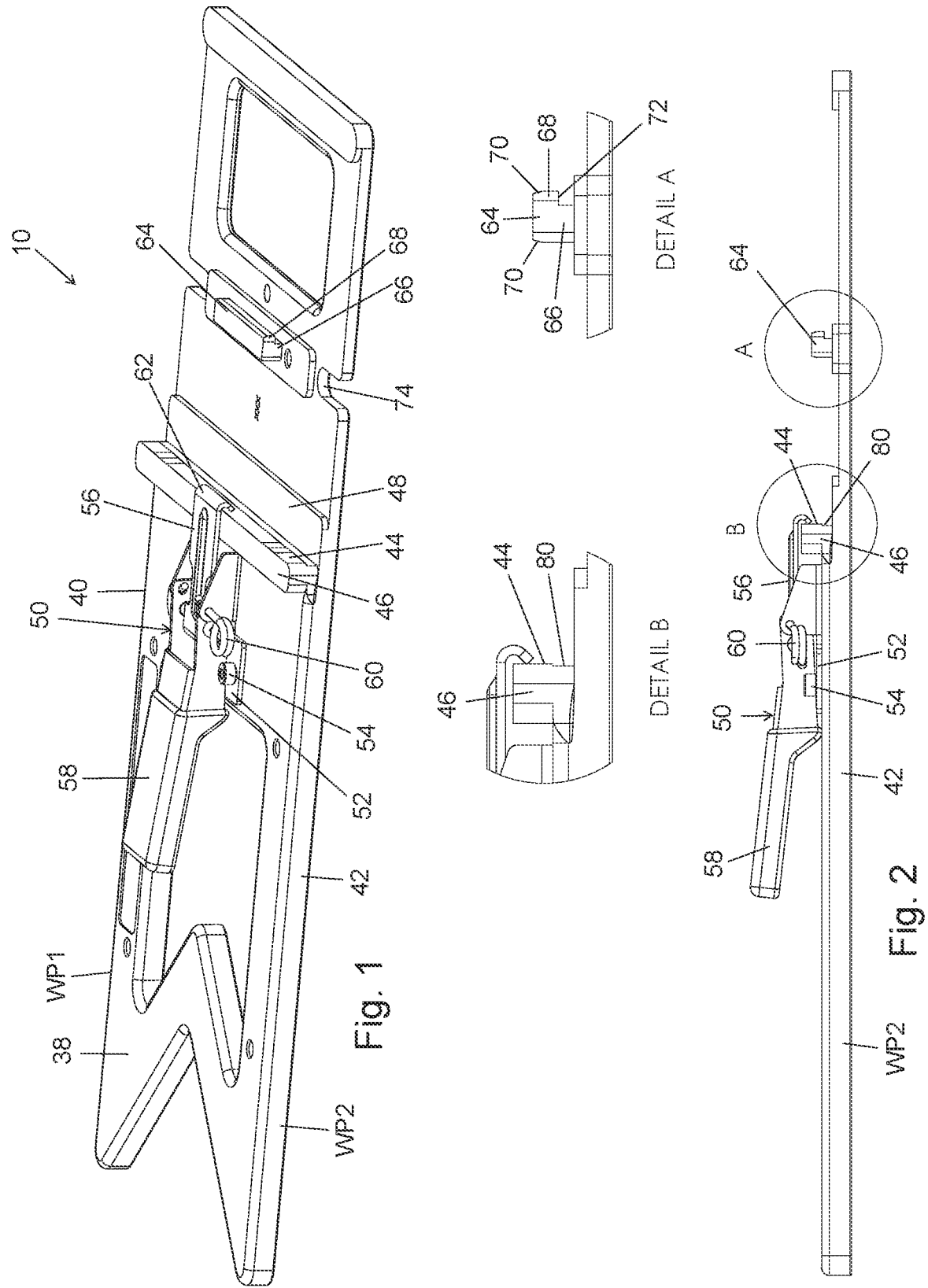

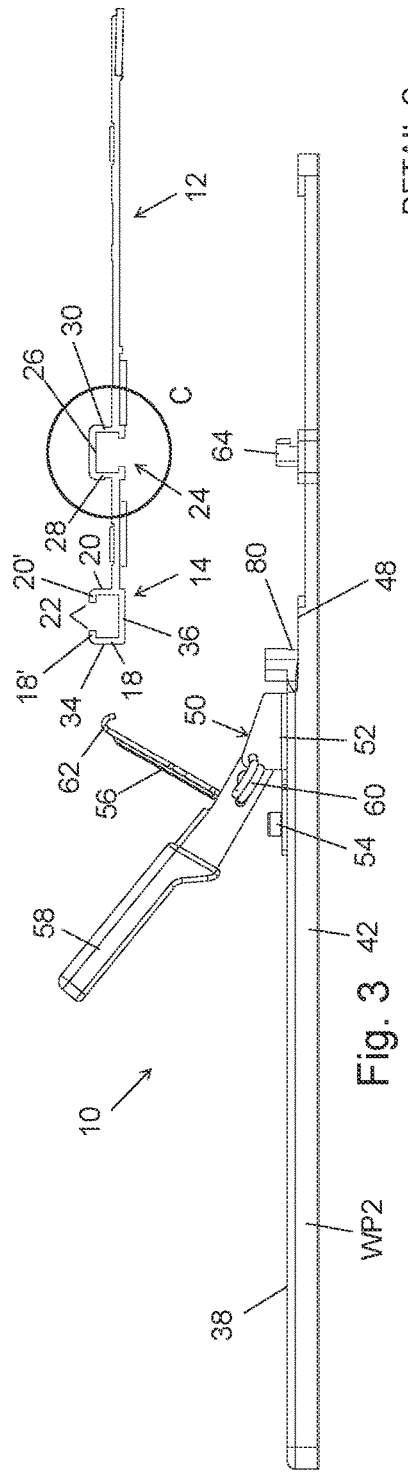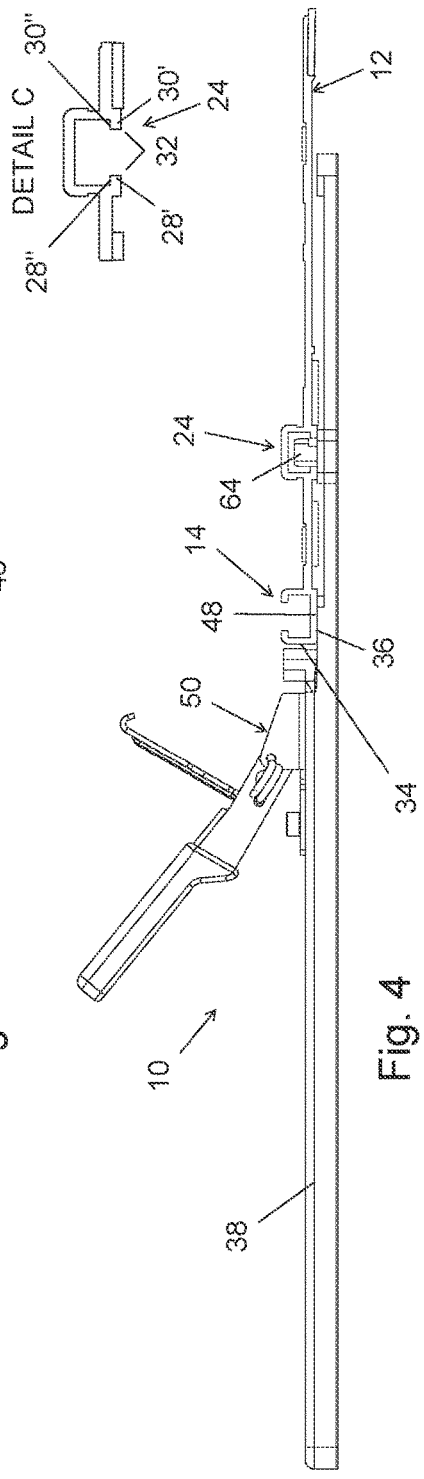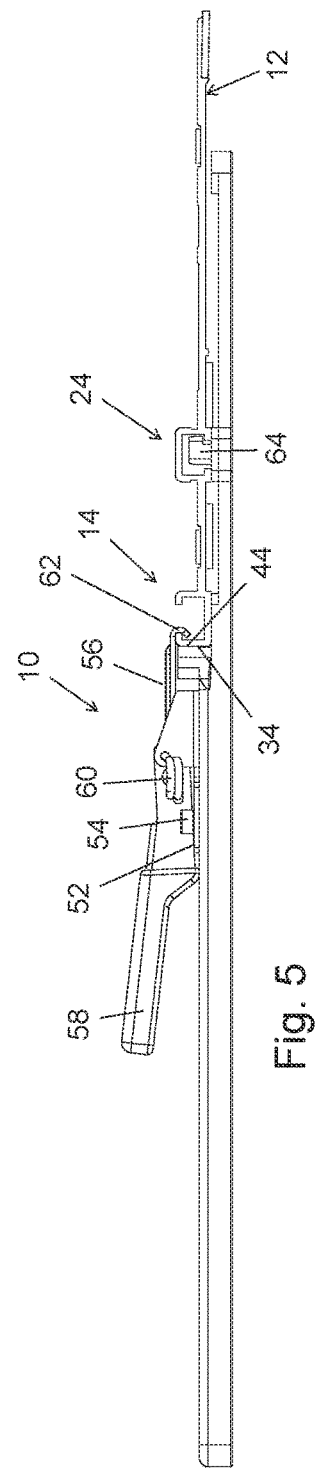

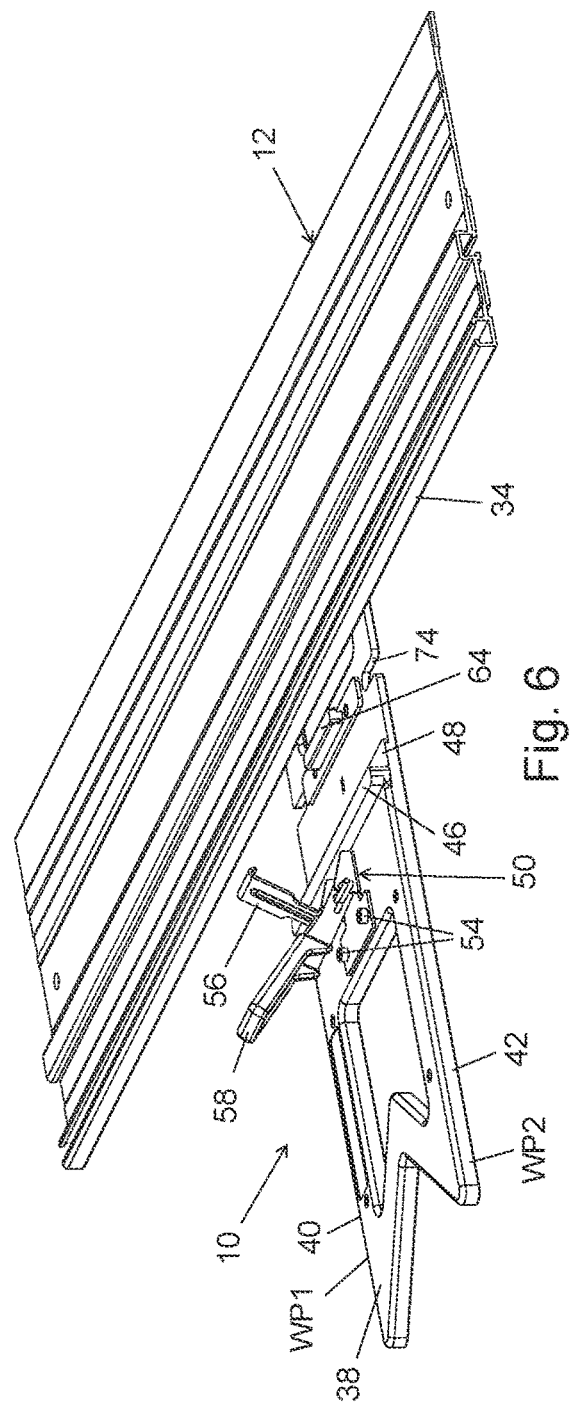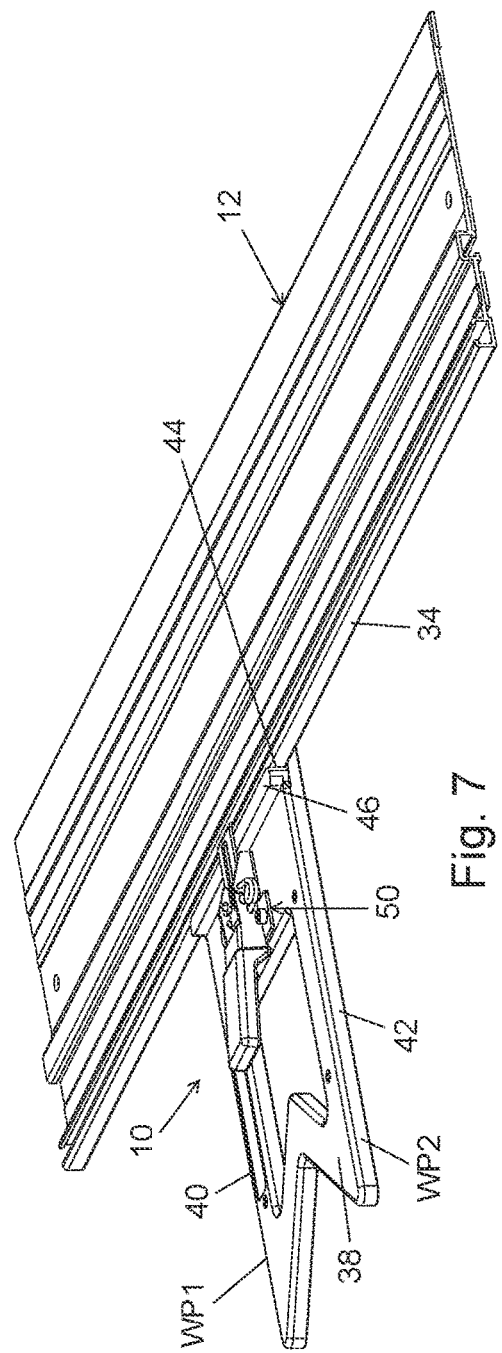

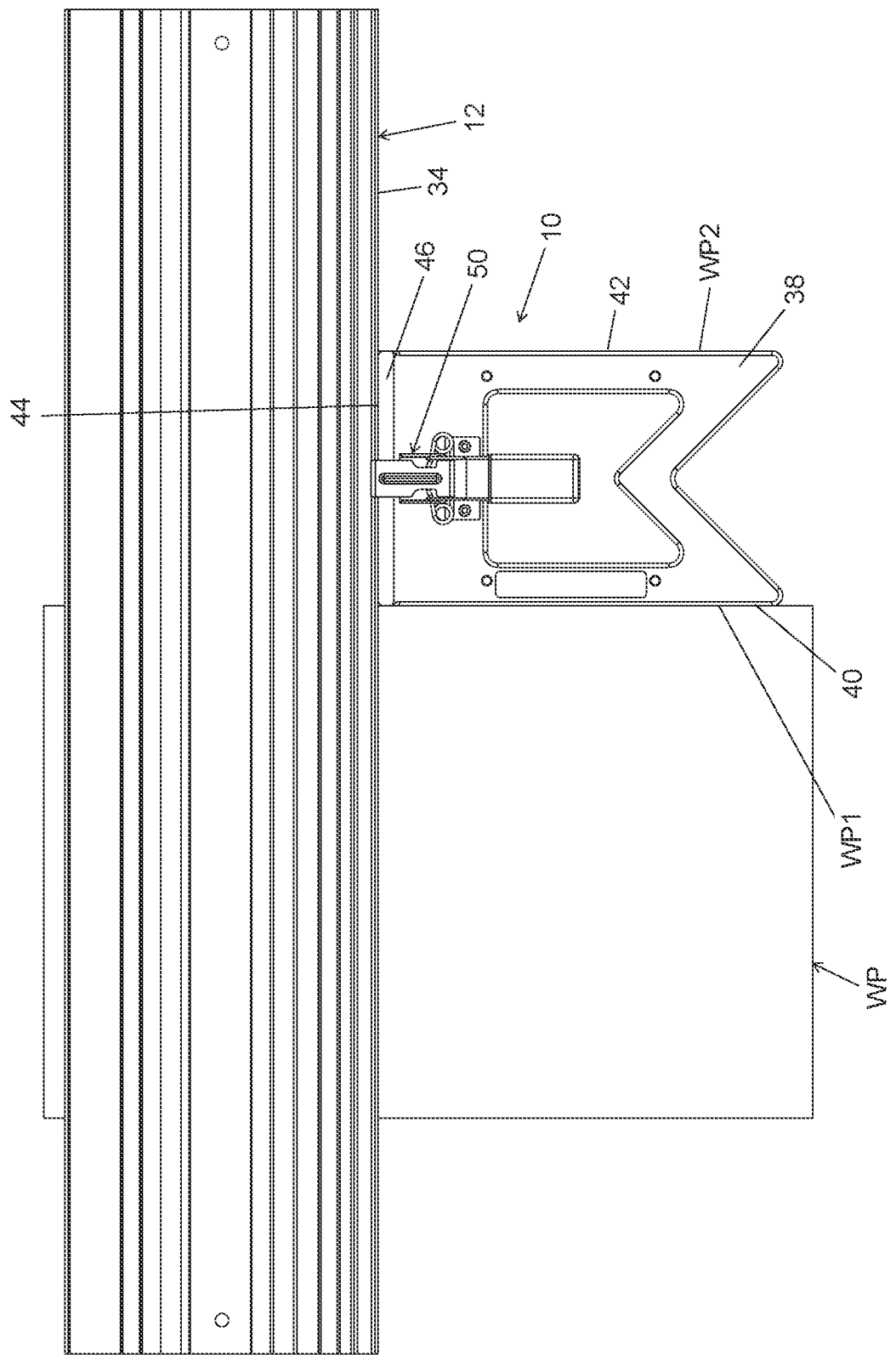

ACCESSORY MOUNTING SYSTEM FOR CONNECTION TO A WORK COMPONENT HAVING AN ELONGATED T-SHAPED SLOT

BACKGROUND OF THE INVENTION

Field of the Invention

The present invention generally relates to accessories configured to a provide temporary or longer-term connection to a work component, and more particularly to structures and methods for an accessory mounting system to provide a quick and accurate removable connection of an accessory to a work component having an elongated T-shaped slot, permitting engagement and connection at any selected location along the length thereof.

Discussion of the Prior Art

The alignment and connection of separate accessories, such as for tools, fixtures, guide assemblies and the like, often relies on use of one or more channels, such as in the form of a T-shaped slot, commonly referred to as a "T-slot". Thus, a T-slot may be present in one or more of two components to be connected for temporary or longer-term use, while a T-shaped retention element is present on the other of the two components and provides for slidable insertion into the end of the T-slot.

This has been achieved for many uses involving connection of accessories and what may be referred to as a work component having a T-slot. However, depending on the desired connection, there may be limitations or inconveniences experienced when making such connections or with respect to the precision and sturdiness of such connections. For example, a common drawback or limitation with prior art configurations involves the steps used in the approach and positioning needed when seeking to connect an accessory having a T-shaped retention element to a work component having a T-slot. This may be the case whether other accessories are already connected to the work component via the T-slot, or the accessory is the first or only component to be connected to the work component having the T-slot.

As an example, this is particularly the case with respect to prior art structures and methods of connecting an accessory, such as an alignment tool, which may be referred to as a guide rail square, to a work component, such as a track saw guide rail. A guide rail for a track saw typically includes an elongated aluminum extrusion having various surfaces that permit attachment of the guide rail to a table or positioning of the guide rail relative to a work piece, such as a sheet of material to be cut, e.g., plywood or press board. The track saw is a circular saw having a base which is received by and slidable along the guide rail. When connected to the guide rail, an alignment tool or guide rail square assists in positioning the guide rail relative to the work piece to be cut. It will be appreciated that the term guide rail square is commonly used to refer to alignment tools that may be connected to a guide rail, and such alignment tools may provide a single or multiple angular orientations relative to a work component, whether such angle or angles are fixed or adjustable.

Such prior art guide rails for a track saw commonly include a T-slot having a longitudinal elongated central opening in the bottom of the guide rail. The T-slot structure permits T-shaped retention elements to be used to establish a principal means of alignment and connection, whether the T-shaped retention element is part of such an alignment tool, or part of a clamp used to secure the guide rail to a table or to a work piece. With any accessory that utilizes the T-slot in the work component, a portion of a T-shaped retention element must extend through the elongated central opening of the T-slot for the T-shaped retention element to be connected to the alignment tool. The T-shaped retention element may include, for example, a fixed T-shaped retention member or a fastening means, such as a T-nut that receives a threaded fastener or a T-bolt.

Notably, prior art devices do not permit drop-on connection between an accessory, such as an alignment tool and a work component having a T-slot. For example, a work component, such as a guide rail having an elongated T-slot in the bottom, cannot be dropped or lowered onto a T-shaped retention element of an alignment tool, such as a guide rail square during a method of connecting the work component to the alignment tool. Thus, connection cannot be made by direct, generally perpendicular insertion of a T-shaped retention element into a T-slot at any preselected location along the work component. Instead, to locate and connect such an alignment tool to such a work component, the T-shaped retention element must enter the T-slot at an end of the work component. Thus, a user must first hold the alignment tool having the T-shaped retention element in a location beyond an end of the work component having the T-slot. Next, the alignment tool must be moved toward the end of the work component until the T-shaped retention element on the alignment tool enters the T-shaped slot in the work component, thereby providing an initial slidable connection of the alignment tool to the work component.

Then, the alignment tool must be slidably moved relative to the work component, by sliding the T-shaped retention element within the elongated T-slot in the work component to reach a desired location along the longitudinal length of the work component. It will be appreciated that depending on the configuration and layout, this may involve moving the alignment tool along the work component or the work component along the alignment tool. If the accessory is in the form of an alignment tool, one may need to then use a separate precision gage along surfaces of the alignment tool and the work component to provide alignment guidance while completing the connection. The separate gage may be used to position the components to be connected in the required relative positions they will assume when finally connected, while also removing any slack or looseness introduced by the fastening method and/or inherently present between the components to be connected.

Finally, a clamp assembly must be applied to removably fix the position of the alignment tool relative to the work component. Such a clamp assembly may include any form of fastening means to removably draw together, or push together, and hold the relative positions of the alignment tool to the work component. However, depending on the clamp assembly employed, it may give rise to inherent inaccuracy of the alignment, due to manufacturing tolerances of the connected alignment tool and work component, or to movement of the components within the clamp assembly. Thus, the separate alignment gage may continue to be needed while the clamp assembly is adjusted and tightened. For example, in light of tolerances and movement of certain fasteners, or movement of the alignment tool or work component when establishing the connection, some prior art clamp assemblies require careful tightening of fasteners to avoid causing unintended displacement and misalignment of the components relative to each other. This is necessary because tightening of the fastening means also can and often does introduce forces that tend to displace the components from their intended position. Repeated checking and adjustments to account for misalignments can be time consuming and inconvenient.

In other prior art examples, a particular type of clamp assembly may be used to draw together the components in a way that moves a reference surface on a work component into contact with a corresponding reference surface on an accessory, such as an alignment tool. This type of connection may assist in ensuring a relative angle and position has been achieved when connecting the alignment tool to the work component and avoid the need for extra checking and adjustment while establishing the connection. However, such an accessory would still require a method of connection wherein the accessory must first be held in a location beyond an end of a work component, followed by moving the accessory toward the work component to insert a T-shaped retention element into the T-shaped slot of the work component, sliding the accessory along the T-slot of the work component to reach a desired location and then applying the clamp assembly to hold the alignment tool in position.

Such a prior art means of connection also may encounter other disadvantages. For example, the reference surface on the work component may not be truly flat and parallel to the reference surface to be used on the accessory. This can result in an obstruction that prevents proper abutting contact during the connection, as well as a tendency to cause deformation of the reference surface of the work component or to have the work component be more susceptible to being displaced from its desire location.

Nevertheless, all of the prior art known to the inventor still requires the inconvenience of having to undertake the initial alignment and slidable engagement of the accessory from an end of the work component, prior to slidable movement of the T-shaped retention element within the T-slot of the work component to reach a final location to removably fix the connection for use. As such, there exists a long felt need for being able to more quickly and conveniently connect an accessory, such as an alignment tool, to a work component, such as a guide rail, via initial generally perpendicular engagement at a selected location along the work component.

SUMMARY

The purpose and advantages of the present invention will be set forth in and apparent from the description and drawings that follow, as well as will be learned by practice of the claimed subject matter. It is the object of this invention to introduce an accessory mounting system for connection to a work component having an elongated T-shaped slot wherein the initial engagement between the accessory and the work component may be provided by drop-on engagement, such as by generally perpendicular movement between the work component and the accessory. Thus, for example, a work component, such as a guide rail, may be dropped or placed onto the accessory, such as an alignment tool in the form of a guide rail square, wherein the retention element on the alignment tool enters the T-slot in the bottom of the work component directly, at any location along the length of the work component. This generally perpendicular engagement eliminates the inconvenient requirement of having to start from a location beyond an end of the guide rail, with insertion into an end of a T-slot in the work component, followed by sliding along the T-slot to arrive at the desired location.

The present disclosure provides example accessories that utilize new retention element structures that are not T-shaped, and methods of connecting an accessory to a work component having a T-slot. The disclosure provides an example of these structures, which is shown in the context of the accessory being an alignment tool, such as a guide rail square, and the work component being a guide rail for a track saw. The alignment tool takes into account the structure of the elongated aluminum extrusion of the guide rail and its various surfaces that permit attachment of the guide rail to a table or placement relative to a work piece, including the surfaces defined by the typical T-slot in the bottom of the guide rail. However, unlike the prior art, the inventive example accessories, in the form of alignment tools, do not rely on traditional T-shaped retention elements as the principal means of alignment and connection, due to the aforementioned disadvantages of such structures in having to initially engage a T-slot from an end of the work component.

The inventive accessory mounting system includes improvements over previous accessory mounting systems, such as have been used in alignment tools having T-shaped retention elements that engage an elongated T-slot in a work component.

A first improvement removes the requirement that one must start the process of connection from an end of the work component. The improved accessory mounting system permits relative movement of a work component perpendicular to and toward an accessory for direct engagement of the accessory at any location along the length of the work component, without having to initially be inserted from an end of the work component.

The examples in the present disclosure rely on a retention element that is not T-shaped, but rather includes an upright portion and a leg portion extending from an upper end of the upright portion. Thus, the retention element is generally half of a T-shaped retention element or generally L-shaped, and has a relative width that will be received through the central opening in the elongated T-slot in the work component. Once the retention element of the accessory is located within the T-slot of the work component, slight lateral movement of the work component will enable the leg portion of the generally L-shaped retention element to overlap one of the inward facing extensions that form the elongated central opening of the T-slot and to thereby block movement of the work component perpendicularly away from the accessory.

A second improvement is found in the shape of an upstanding reference surface on the accessory. By providing an undercut or recess near the bottom of such reference surface, the reference surface is able to accommodate some variations that may be present in a corresponding reference surface on a work component. Depending on the contour of the reference surface of the work component, this may improve the abutting engagement between the corresponding reference surfaces of the accessory and the work component, as one or more portions of the reference surface that are further from the bottom of the work component are more likely to be provide consistent abutting engagement. This also may have the added benefit of permitting any distortion toward the lower portion of an outer side wall reference surface of a work component to extend into the undercut or recessed area on the reference surface of the accessory, which may help to resist upward movement of the work component relative to the accessory when completing the connection of the two components.

It will be appreciated that within this disclosure, a reference surface or guide surface that is to be used for abutting engagement may be defined, for example, by a broad flat surface, or at least two spaced apart aligned features that could be provided by any flat, curved, pointed or other surfaces, which together may be considered to define an elongated surface for purposes of providing abutting engagement. The example accessories also employ a clamp assembly that applies a force to impart lateral movement, such as to simply draw the accessory and work component together at complementary reference surfaces and into abutting engagement. As such, this does not introduce any torque or other forces that would tend to displace the components from a desired alignment within the plane of the work component. To the extent the clamp assembly may cause the work component to tend to attempt to lift at its far edge and pivot relative to the abutting reference surfaces, the leg portion of the generally L-shaped retention element will engage an extension of the elongated T-slot and block such upward movement of the work component.

Depending on the clamp assembly utilized, the clamp assembly also may compensate for any dimensional difference resulting from normal manufacturing tolerances or similar causes by employing a suitably strong clamp load, such as may be applied by an optional biasing element, such as a spring between a fastener and a base, such as in a lever actuated clamp assembly having a latch as the fastener. Alternatively, the force may be applied by other suitable clamp assembly structures, such as may include a threaded engagement to impart lateral movement, for example, such as to draw a reference surface of the work component into abutting engagement with a corresponding reference surface of the accessory. Thus, alternative mechanisms or the like may be provided on the accessory to cause relative lateral movement of the work component and accessory by use of alternative forms of fasteners of clamp assemblies.

In a first aspect, the present disclosure provides an accessory mounting system for connection to a work component having an elongated central opening to a T-shaped slot, the accessory mounting system including a generally planar body, a retention element connected to the body, a clamp assembly spaced from the retention element and being connected to the body, a first reference surface extending upward from the body and in a first direction and being located between the retention element and the connection of the clamp assembly to the body, the retention element comprising an upright portion and a leg portion extending from an upper end of the upright portion, the clamp assembly having a portion extending toward the retention element and that moves the work component laterally relative to the first reference surface, and wherein the retention element upright portion and leg portion are sized to be received through the elongated central opening to the T-shaped slot in the work component at any location along the work component.

In another aspect, the present disclosure provides a method of connecting an accessory to a work component having an elongated T-shaped slot, wherein the method includes placing an accessory on a flat surface, the accessory including a generally planar body, a retention element connected to the body, a clamp assembly spaced from the retention element and being connected to the body, the retention element including an upright portion and a leg portion extending from an upper end of the upright portion, a first reference surface on the body and being located between the retention element and the connection of the clamp assembly to the body. The method further including holding a work component in a selected location above the accessory, with the work component further including a longitudinally extending elongated T-shaped slot having a central opening defined by spaced apart extensions, and having a reference surface on a side wall of the work component. The method also including lowering the work component onto the accessory, wherein the retention element upright portion and leg portion of the accessory are received by the T-shaped slot through the elongated central opening of the work component. The method additionally including engaging the clamp assembly, wherein the work component is moved laterally relative to the elongated T-shaped slot to a location wherein the first reference surface on the body of the accessory abuts the reference surface on the side wall of the work component, and wherein the leg portion of the retention element underlies one of the extensions that defines the central opening of the elongated T-shaped slot.

In a further aspect, the present disclosure provides an accessory for connection to a work component having an elongated central opening to a T-shaped slot and for use in aligning the work component with a work piece, the accessory comprising a body having a first reference surface extending upward from the body and in a first direction, a retention element extending upward and being spaced from the first reference surface in a second direction, a clamp assembly connected to the body and having a fastener extending in the second direction past the first reference surface, wherein the retention element is generally L-shaped and further comprises an upright portion and a leg portion extending from an upper end of the upright portion in the second direction, and wherein the fastener has a distal end and the clamp assembly is movable to draw the distal end toward the first reference surface of the accessory.

As above noted, the example accessory mounting system, accessory and example methods of connecting such accessory to a work component having an elongated T-shaped slot of this disclosure provide several advantageous features. The example accessories and methods provide the ability to quickly and conveniently connect the accessory to a work component by a drop-on method at any location along the work component, and without need to use a separate gage to check the accuracy of the alignment between the two components. Additionally, an undercut or recess near the bottom of a first reference surface on the accessory enables the first reference surface to accommodate some variations that may be present in a corresponding reference surface on a work component.

It is to be understood that both the foregoing general description and the following detailed description are exemplary and provided for purposes of explanation only, and are not restrictive of the subject matter claimed. Further features and objects of the present disclosure will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein:

FIG. 1 is an upper perspective view of a first example accessory having an accessory mounting system for connection to a work component having an elongated T-shaped slot;

FIG. 2 is a side view of the accessory of FIG. 1, with Detail A and B enlargements showing the side profile of a retention element on the accessory body and a recess in a first reference surface on the accessory;

FIG. 3 is a side view of an accessory of FIG. 1 located above a work component prior to connection and with a clamp assembly in an open position, with a Detail C enlargement showing the side profile of the T-shaped slot that receives the retention element on the accessory;

FIG. 4 is a side view of the accessory of FIG. 3 lowered onto the work component of FIG. 3 and prior to engagement of the clamp assembly, which is in the open position of FIG. 3;

FIG. 5 is a side view of the accessory of FIG. 4 on the work component of FIG. 4 and after engagement of the clamp assembly, which is in a closed position;

FIG. 6 is an upper perspective view of the accessory and work component in the locations shown in FIG. 3, with the work component ready to be dropped onto the accessory during a method of connection of the accessory and work component;

FIG. 7 is an upper perspective view of the accessory and work component in the location shown in FIG. 5, with the work component having been lowered onto the accessory and after engagement of the clamp assembly;

FIG. 8 is a top view of the accessory and work component in the location shown in FIGS. 5 and 7;

Figure 9:
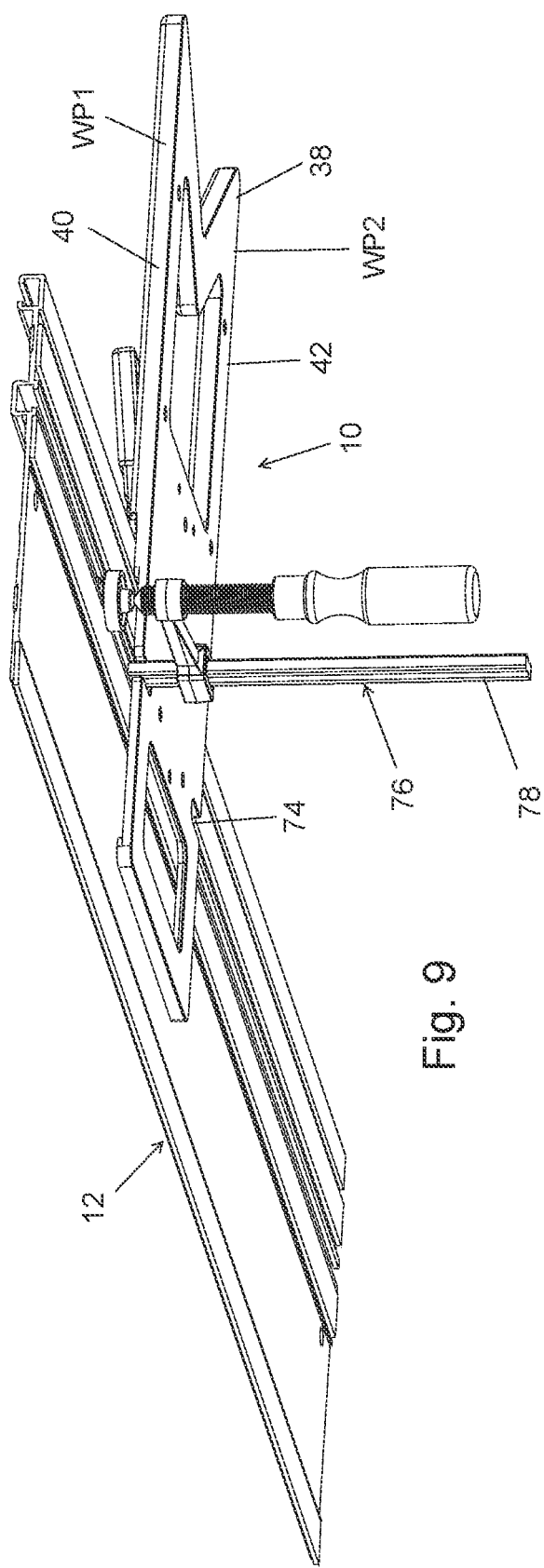
FIG. 9 is a lower perspective view of the accessory and work component in the location shown in FIGS. 5 and 7, and further with a portion of a clamp passing through a clamp receiving notch in the body of the accessory.

It should be understood that the drawings are not to scale. While some mechanical details of example accessories and work components, including other plan and section views of the examples shown and of examples that may have alternative configurations have not been included, such details are considered well within the comprehension of those of ordinary skill in the art in light of the present disclosure. It also should be understood that the present invention is not limited to the example embodiments illustrated.

DETAILED DESCRIPTION OF THE PREFERRED EMBODIMENTS

For the following defined terms, these definitions shall be applied, unless a different definition is given in the claims or elsewhere in this disclosure. As used in this disclosure and the claims, the singular forms "a", "an", and "the" include plural referents unless the content clearly dictates otherwise. As used in this disclosure and the claims, the term "or" is generally employed in its sense including "and/or" unless the content clearly dictates otherwise.

Referring generally to FIGS. 1-10, it will be appreciated that accessories having an accessory mounting system for connection to a work component having an elongated central opening to a T-shaped slot of the present disclosure generally may be embodied within numerous configurations and may be used in various ways to enhance the convenience of users when connecting accessories to work components. Indeed, while acknowledging that all example configurations of accessories need not be shown herein, examples are shown and discussed to better demonstrate that a variety of configurations and methods of use are contemplated.

Turning to a first example embodiment of an accessory 10 shown in FIGS. 1-9, it will be appreciated that the accessory 10 may be provided for connection to a work component 12, which is shown in FIGS. 3-9. One example of such apparatus is provided in the first example embodiment, wherein the accessory is an alignment tool 10. As shown in FIGS. 3-9, the alignment tool 10 may be removably connected to a work component 12, which is shown in FIGS. 3-9 as a guide rail for a track saw. Such a guide rail for a track saw may be commonly referred to as a guide rail 12, and it essentially is a metal extrusion in the form of a track for guiding power tools, such as a track saw. For example, the guide rail 12 may be used with a handheld circular saw for cutting a work piece, such as a flat sheet material, which may be plywood, pressboard or other materials. In the particular configuration shown, the work component 12 may be used with a circular saw designed to be used with the guide rail. Thus, the saw may incorporate or accommodate a base that is adapted for precision sliding movement along the extruded guide rail 12.

Among other shapes and surfaces, the extruded guide rail of the work component 12 includes a first T-shaped slot 14, or T-slot 14, which is longitudinally extending and upward facing. The T-shaped slot 14 features a channel 16 having a first side wall 18 and a second side wall 20. The upper ends of the side walls 18, 20 include extensions 18', 20' that extend toward each other and the opposed extensions 18', 20' define an elongated central opening 22 to the T-slot 14. The work component 12 also includes a second T-shaped slot 24, or T-slot 24, which is longitudinally extending and downward facing. The T-shaped slot 24 is parallel to the T-slot 14, and thus parallel to and spaced apart from the first side wall 18. The T-slot 24 features a channel 26 having a first side wall 28 and a second side wall 30. The lower ends of the side walls 28, 30 include extensions 28', 30' that extend toward each other and the opposed extensions 28', 30' define an elongated central opening 32 to the T-slot 24.

The work component 12 includes reference surfaces that may be used when connecting an accessory 10, such as an alignment tool, to the work component 12. The example alignment tool 10 may be configured to be connected in a precisely aligned relationship with the work component 12 via use of complementary reference surfaces. The upward facing first T-slot 14 is located along an outer edge of the work component 12, such that the first side wall 24 includes an outer surface, which may be referred to as a first side wall surface or first reference surface 34. The first side wall outer surface or first reference surface 34 of the work component 12 extends longitudinally in a first direction, which is parallel to the first T-slot 14.

The bottom of the work component 12 provides a second reference surface 36, which is perpendicular to the first side wall 24 or first reference surface 34 of the work component 12. The downward facing second T-slot 24 has the central opening 32 along the bottom of the work component 12 and is located along a more central region of the work component 12, spaced apart from the first side wall 24 and its first reference surface 34. The T-slot 24 also extends longitudinally in the first direction. For purposes of the present disclosure, the upward facing surface of the extensions 28', 30', which are within the T-slot 24, present third reference surface 28", 30" of the work component 12. It will be appreciated that each reference surface of the work component 12 extends longitudinally along at least a portion of the length of the work component 12 and may extend in a continuous or segmented manner, or otherwise may be defined by at least two spaced apart features or portions.

The accessory or alignment tool 10 is configured to achieve precise alignment with the work component 12 via abutting complementary reference surfaces, while also providing one or more guide surfaces for abutting a work piece or other object to be cut or otherwise positioned by use of the alignment tool. The accessory 10 includes a generally planar body 38 that may be constructed for example of machined aluminum, but it will be appreciated that the body 38 may be constructed of any suitable rigid material, whether metal or plastic and machined, cast or molded. In this example, the body 38 includes at least a first side wall 40 and opposed second side wall 42. It will be appreciated that other configurations may be provided with fewer or more side walls, and the side walls may provide guide surfaces. For example, the first side wall 40 presents a first work piece guide surface WP1, while the second side wall 42 may present a second work piece guide surface WP2. It will be appreciated that a guide surface may extend along at least a portion of a side wall or other surface of the body 38 and may extend in a continuous or segmented manner, or otherwise may be defined by at least two spaced apart features or portions that together may define a guide surface.

The body 38 of the alignment tool 10 also includes a first guide surface or first reference surface 44 provided by an upstanding rib or wall 46 that extends longitudinally in the first direction, and is located along a central region of the body 38. The first reference surface may be flat or may include at least two contact locations that together establish a desired abutting reference surface. It will be appreciated that the first work piece guide surface WP1 extends in a second direction that is perpendicular to the first guide surface or first reference surface 44. It also will be appreciated that the first guide surface or first reference surface 44 also extends in an upright direction.

The generally planar body 38 of the accessory 10 further includes a second guide surface or second reference surface 48, which is upward facing, and therefore, perpendicular to the first guide surface or first reference surface 44 of the accessory 10. The second reference surface 48 provides a landing against which the work component 12 may rest. Although they are shown as continuous elongated surfaces, it will be appreciated that each of the first and second reference surfaces 44, 48 of the alignment tool 10 may extend in a continuous or segmented manner, or otherwise may be defined by at least two spaced apart features or portions.

The accessory 10 further includes a clamp assembly that moves the work component laterally, so as to establish the removable connection therewith. In the present example, the clamp assembly 50 is configured to be mounted to the body 38 of the alignment tool 10 and to extend in the second direction past at least the first guide surface or first reference surface 44 of the alignment tool 10. The example clamp assembly 50 includes a base 52 that is connected to the body 38, such as by mechanical anchors 54 in the form of bolts or rivets, or by other suitable methods of connection. In this example, the clamp assembly 50 also includes a fastener 56 in the form of a latch, a lever 58, and biasing elements 60 that are connected to the base 52, latch 56 and lever 58. The fastener or latch 56, lever 58 and biasing elements 60 are constructed and connected to permit the lever 58 to operate the latch 56, under the influence of the biasing elements 60. While biasing elements 60 are shown as two springs, it will be appreciated that, depending on the configuration chosen, there may be at least one biasing element.

The fastener or latch 56 extends in the second direction past the first guide surface or first reference surface 44 of the accessory 10, as well as past the first side wall outer surface or first reference surface 34 of the work component 12. This permits that fastener or latch 56 to capture the work component 12. More particularly, the distal end of the latch 56 includes a flange 62. It will be appreciated that, as the latch 56 extends in the second direction, perpendicular to and across the first guide surface or first reference surface 44 of the alignment tool 10, it also extends parallel to the work piece guide surface WP1.

Accordingly, when the lever 58 is pivoted upward, the latch 56 moves to extend further from the base 52, which allows the latch 56 to pivot to raise the flange 62, to assume the open position shown in FIGS. 3, 4 and 6. In this example, the pivotal positions of the lever 58 and latch 56 are advantageously configured to have an over-center movement to a closed position, which utilizes the biasing elements 60, in the form of springs, so that when the lever 58 is pivoted downward toward the closed position shown in FIGS. 1, 2, 5, 7, 8 and 9, the flange 62 of the latch 56 has been drawn closer toward the base 52 of the clamp assembly 50. The biasing elements 60 provide consistent force to maintain the abutting connection and automatically resists or resets the connection if it is otherwise disturbed, such as by an inadvertent impact.

In the example shown, the alignment and security of the connection may be enhanced by an additional engagement of reference surfaces between the two components. For instance, additional reference surfaces may prevent forces from tending to rotate, twist or otherwise move the accessory 10 relative to the work component 12 in a manner that otherwise might defeat the alignment function. The engagement of such additional surfaces or features need not be particularly accurate but will still act to limit unintended relative movement of the mated components to a degree which will not allow the function of the clamp assembly 50 to be defeated.

For example, the alignment tool 10 is shown with an upstanding retention element 64, which in this example is generally L-shaped and includes an upright portion 66 and a leg portion 68 extending from an upper end of the upright portion 66. The retention element 64 is suitably sized to be received through the central opening 32 of the T-shaped slot 24 in the bottom of the work component 12, when the work component 12 is moved directly perpendicularly into engagement with the accessory 10. Thus, the work component 12 advantageously may be held in a location above the accessory 10, at any location along the length of the work component 12, such as is shown in FIGS. 3 and 6, to utilize a "drop-on" method of engagement. This will be understood to be a method of engagement wherein the work component 12 is set down onto the alignment tool 10, at any location along the length of the work component 12, during which the retention element 64 enters the elongated central opening 32 and is received in the T-shaped slot 24. The retention element 64 thereafter is slidable longitudinally within the T-slot 24, if there is a need to adjust the relative location of the accessory 10 along the work component 12.

It will be appreciated that for the retention element 64 to be ablet to pass through the elongated central opening 32 of the T-slot 24, the upright portion 66 and the extent to which the leg portion 68 extends from the upright portion 66 together will define a width of the retention element that will pass through the width of the elongated central opening 32. In addition, the leg portion 68 of the retention element 64 may include one or more chamfers 70 that may assist in guiding the retention element into the elongated central opening of the T-shaped slot 24 in the work component 12, as the work component 12 is brought into engagement with the accessory 10, as shown in FIG. 4.

Advantageously, after the retention element is received through the elongated central opening 32 of the downward facing T-shaped slot 24, the retention element is slidable within the channel 26 of the T-slot 24. Thus, the location of the accessory 10 may be adjusted relative to the work component 12, after the drop-on method of engagement. It will be appreciated that a T-slot is commonly found in extrusions of typical work components in the form of rails, such as guide rails for track saws or other work components to which accessories may be removably connected. This feature is intentionally relatively loose fitting, so as not to interfere with zero-clearance mating of the respective first reference surfaces 44, 34 of the alignment tool 10 and work component 12.

The leg portion 68 of the retention element 64 extends from the upper end of the upright portion 66 in a direction away from the first reference surface 44 on the body 38 of the accessory 10. It will be appreciated that once the retention element 64 is received by the downward facing T-slot 24, with slight lateral movement of the work component 12 toward the first reference surface 44 of the accessory 10, the first reference surface 44 of the alignment tool 10 effectively is self-aligning with and abuts the first reference surface 34 of the work component 12. Simultaneously, the slight lateral shift of the work component 12 relative to the alignment tool 10 causes a lower surface 72 of the extending leg portion 68 to provide a stop that will engage and restrict upward movement of the upward facing third reference surface 30" of the extension 30' of the T-shaped slot 24 of work component 12.

Thus, the retention element 64 is highly useful in initially aligning the alignment tool 10 with the work component 12, but thereafter assists in maintaining connection of the two components by preventing rotation of the work component 12 relative to or about the first reference surface 44 of the alignment tool 10, when the first reference surface 44 of the accessory 10 is abutting the first reference surface 34 of the work component 12. Accordingly, if the clamp assembly 50 is used to draw the work component 12 toward the first reference surface 44 on the alignment tool 10, the leg portion 68 will prevent lifting or rotation upward of the work component 12 that may otherwise be imparted by pulling of the latch 56 on the first side wall 18 of the upward facing T-shaped slot 14 of the work component 12. Thus, the retention element 64 and lateral movement of the work component 12 relative to the accessory 10 when completing the connection remove the need to initially insert a retention element from an end of the work component 12. The retention element 64 also helps to maintain the connection between the two components 10, 12, while advantageously being sized to be received directly into the downward facing T-shaped slot 24 at any location along the work component 12.

FIGS. 3-7 are particularly instructive regarding the connection of the accessory 10 and work component 12. FIGS. 3 and 6 show the accessory 10, as though it is placed on a flat surface, and the work component 12 is being held in a selected location above the accessory 10, at any location along its length of the work component 12. FIG. 4 then shows the work component 12 after using the drop-on method, wherein it has been placed onto the accessory 10. This is represented in FIG. 4 by having the first reference surface 44 of the alignment tool 10 slightly spaced apart from the first side wall outer surface or first reference surface 34 of the work component 12. It will be appreciated that the work component 12 may be moved laterally, slightly back and forth, after the upright portion 66 and leg portion 68 of the retention element 64 have been received by the T-shaped slot 24 through the elongated central opening 32 by lowering the work component 12 onto the accessory 10.

FIGS. 5 and 7 show the work component 12 after the outer surface 34 of the first side wall 18 has been brought into abutting engagement with the first reference surface 44 of the accessory 10. The second reference surface 48 of the alignment tool 10 also was brought into abutting engagement with the second reference surface of 36 on the bottom of the work component 12, when the work component 12 was set down upon the accessory 10. In FIGS. 5 and 7, the flange 62 at the distal end of the fastener or latch 56 also has been positioned to extend past the first reference surface 44 of the alignment tool 10 and past the first side wall outer surface or first reference surface 34 of the work component 12. The fastener or latch 56 has been pivoted downward, so as to engage the extension 18' on the first side wall 18 of the work component 12. With the lever 58 then pivoted downward to a closed position, the fastener or latch 56 and its flange 62 are pulled toward the base 52 of the clamp assembly 50 until the first reference surface 44 of the alignment tool 10 is securely abutting the first side wall outer surface or first reference surface 34 of the work component 12.

In this example, the over-center travel of the lever 58 causes it to automatically be retained in the closed position, until a deliberate force is applied to move the lever 58 by pivoting upward to an open position. In addition, the biasing elements 60 bias the latch 56 toward the base 52 of the clamp assembly 50, which additionally aids in maintaining a firm connection between the alignment tool 10 and work component 12. Thus, actuation of the lever 58 can quickly and conveniently draw the two components together into abutting engagement of the respective first reference surfaces 44, 34 which assures a proper alignment of the alignment tool 10 and work component 12, without need of other tools, or readjustment, and without need to check the alignment with a separate gage.

It will be appreciated, however, that the clamp assembly 50 may have a different structure and application of a fastener, alternatively to fastener 56, which could be utilized without tools, or with tools but in a simple manner that does not require use of a second gage or rechecking of the alignment achieved by use of the abutting engagement of the respective first reference surfaces. For example, the clamp assembly may have a different structure that draws together the first reference surfaces of the work component and accessory. Alternatively, if the leg portion of the retention element is configured to extend in the opposition direction, so as to extend toward the first reference surface of the accessory, then the clamping assembly may be configured to have the wall on the accessory that provides the first reference surface be movable, and to force such wall toward the work component, so as to have the leg portion be in a location to engage the surface 28" and block upward movement of the extension 28' and thereby of the work component 12. In a still further alternative, if the leg portion of the retention element extends toward the first reference surface of the accessory, then the clamp assembly may be configured to draw the retention element toward the first reference surface of the accessory 10 to complete the connection of the work component and accessory. Thus, it will be appreciated that relative lateral movement of the work component, the first reference surface of the accessory or the retention element of the accessory may be imparted by a clamp assembly to facilitate the blocking function of the retention element, while completing the connection of the work component and accessory.

It also will be appreciated that the configuration of the example clamp assembly 50 applies a continuous force when in a closed or latched position, to keep the work component and accessory securely aligned and in the same position relative to each other, as long as the user wishes and without any additional attention or verification. The clamp assembly 50 may be constructed of steel, carbon fiber or other materials of suitable strength in such a manner that the force applied is self-regulating and independent of normal variations in the interfacing dimensions of the mating components. While a biasing elements 60 may be used for this function, this also may be achieved through the use of latch components which are elastic enough to be pulled tight over center with the resulting deflection of the steel or similar strong but flexible material producing the required clamping force to be achieved and maintained without deforming the fastener or latch 56, or side wall 18, through repeated usage cycles. As noted, the clamp assembly may have alternate structures to generate relative movement of a fastener and thereby of the work component, and may maintain its position via other configurations than an over-center lever and latch.

For added convenience, the body 38 of the alignment tool 10 may include a notch 74 to accommodate usage of a clamp 76, as shown in FIG. 9. The notch 74 permits the bar 78 of the clamp 76 to apply a clamp load more directly through the area to be clamped. The head of the clamp 76 may be received by the downward facing T-shaped slot 24, as shown in FIG. 9. Although not shown in FIG. 8, the clamp 76 may be used to hold the work component 12 in place relative to a work piece, such as the sheet material WP.

As will be appreciated by the above description, the retention element 64 and clamp assembly 50 permit rapid connection of the alignment tool 10 to the work component 12. A drop-on method of initial engagement, at any location along the length of the work component 12, followed by employing the clamp assembly 50 to move the work component 12 laterally, such as by drawing the first reference surface 34 of the work component 12 into abutting engagement with the first reference surface 44 of the accessor 10.

In addition, the present accessory 10 includes an improvement to address the fact that some work components, such as guide rails, may not have perfectly perpendicular bottom to side wall surfaces transitions or perfectly vertical outer side walls. Thus, due to manufacturing influences, such as shrinkage of heated aluminum when forming extruded guide rails, the outer side wall 18, which provides the first reference surface 34, may not always be vertical or perpendicular to the bottom surface of the work component. This may be manifested in a slight irregularity of the shape near the bottom of the outer side wall, such as in the side wall 18, which provides the first reference surface 34 of the work component 12. A further improvement herein includes an undercut or recess 80 near the bottom of the first reference surface 44 on the wall 46 of the accessory 10. The recess 80 may receive such an irregularity in the first reference surface 34 of the work component 12, so as to ensure better abutting engagement between the corresponding first reference surfaces 44, 34 of the accessory 10 and work component 12.

In the example shown, given that the first reference surface 44 is perpendicular to the first work piece guide surface WP1 of the alignment tool 10, the positive abutting engagement of the first and second reference surfaces 44, 48 of the alignment tool 10 with the respective first and second reference surfaces 34, 36 of the work component 12 will necessarily result in the extruded track of the work component 12 being precisely perpendicular to the first work piece guide surface WP1. The accessory 10 and its first work piece guide surface WP1 also extend beneath the work component 12, so as to provide an elongated first work piece guide surface WP1 for greater accuracy when engaging a work piece WP, such as the sheet material shown in FIG. 8. These features ensure that when the first work piece guide surface WP1 is placed against an edge of a work piece WP, the work component 12 will be precisely perpendicular to the work piece, so as to provide precise alignment and cutting of the work piece WP. In addition, the over-center movement of the lever 58 to the closed position effectively avoids having to account for tolerances or movements related to positioning or torque applied to fasteners, or loosening of the connection between the accessory 10 and work component 12 during use, as well as the need to use a separate gage to check and recheck their alignment, etc. Similarly, the second work piece guide surface WP2 alternatively may be placed against an edge of the work piece WP to make a cut at the precise preselected angle of the second work piece guide surface WP2. In addition, it will be appreciated that any preselected angle associated with the alignment tool 10 can be repeatedly utilized, once the work component 12 is connected to the accessory 10.

In accordance with the above description, it will be appreciated that the present disclosure provides an accessory mounting system for connection to a work component. As shown with respect to the example in FIGS. 1-9, a work component 12 may have an elongated central opening 32 to a T-shaped slot 24, the accessory mounting system includes a generally planar body 38, a retention element 64 connected to the body40, a clamp assembly 50 spaced from the retention element 64 and being connected to the body 38, a first reference surface 44 extending upward from the body 38 and in a first direction and being located between the retention element 64 and the connection of the clamp assembly 50 to the body 38. The retention element 64 includes an upright portion 66 and a leg portion 68 extending from an upper end of the upright portion 66. The clamp assembly 50 has a portion extending toward the retention element 64 which moves the work component 12 laterally relative to the first reference surface 44, and the retention element upright portion 66 and leg portion 68 are sized to be received through the elongated central opening 32 to the T-shaped slot 24 in the work component 12 at any location along the work component 12.

In this example, the retention element 64 is generally L-shaped. The example leg portion 68 extends from the upper end of the upright portion 66 in a direction away from the first reference surface 44 of the accessory 10. The leg portion 68 of the retention element 64 also may include at least one chamfer 70 that assists in guiding the retention element 64 into the elongated central opening 32 to the T-shaped slot 24 in the work component 12. The central opening 32 to the T-shaped slot 24 is in the bottom of the work component 12, which is a surface that faces the accessory 10. With these structures, the example accessory mounting system provides for the work component 12 to be able to be dropped onto the accessory 10 at any location along the work component 12, with the retention element 64 being received through the elongated central opening 32 to the T-shaped slot 24 in the bottom of the work component 12.

The clamp assembly 50 also includes a base 52 connected to the body 38 of the accessory 10. The clamp assembly 50 has a portion extending toward the retention element 64. In the example shown, the portion of the clamp assembly 50 that extends toward the retention element 64 includes a fastener 56 and extends past the first reference surface 44 of the accessory 10. The clamp assembly 50 also includes a lever 58 and the fastener 56 is a latch that is connected to the lever 58. The lever 58 is pivotally connected to the base 52 of the clamp assembly 50 and the latch 56 is pivotally connected to the lever 58. The clamp assembly 50 also may include at least one biasing element 60 connected to the base 52 and the fastener 56.

The accessory mounting system is shown, for example, for use in connection to a work component 12 that is in the form of a guide rail for use with a track saw, and the accessory 10 is shown in the form of an alignment tool. The alignment tool 10 of the example accessory shown is a guide rail square for use with the work component 12 that includes a guide rail for use with a track saw.

With the example accessory mounting system shown, the first reference surface 44 further comprises an upstanding wall 46. The first reference surface 44 also includes an advantageous recess 80 near the bottom of the wall 46. The body 38 further includes a work piece guide surface WP1 or WP2 extending in a second direction which is at an angle to the first reference surface 44. The work piece guide surface WP1 or WP2 includes a side of the body 38. The example body 38 may further include at least one notch 74 that extends inward from a side 40 or 42 of the body 38 and permits passage of a portion of a clamp 76.

The above description also includes a method of connecting an accessory 10 to a work component 12 having an elongated T-shaped slot 32, with the method including placing an accessory 10 on a flat surface. The example accessory 10 including a generally planar body 38, a retention element 64 connected to the body 38, a clamp assembly 50 spaced from the retention element 64 and being connected to the body 38, the retention element including an upright portion 66 and a leg portion 68 extending from an upper end of the upright portion 66, with a first reference surface 44 on the body 38 which is located between the retention element 64 and the connection of the clamp assembly 50 to the body 38. The method further includes holding a work component 12 in a selected location above the accessory 10, with the work component 12 including a longitudinally extending elongated T-shaped slot 24 having a central opening 32 defined by spaced apart extensions 28", 30", and having a first reference surface 34 on a side wall 18 of the work component 12. The method also includes lowering the work component 12 onto the accessory 10, wherein the retention element upright portion 66 and leg portion 68 of the accessory 10 are received by the T-shaped slot 24 through the elongated central opening 32 of the work component 12, followed by engaging the clamp assembly 50, wherein the work component 12 is moved laterally relative to the elongated T-shaped slot 24 to a location wherein the first reference surface 44 on the body 38 of the accessory 10 abuts the first reference surface 34 on the side wall 18 of the work component 12, and wherein the leg portion 68 of the retention element 64 underlies one of the extensions 28", 30" that defines the central opening 32 of the elongated T-shaped slot 24.

In the above example method of connecting an accessory 10 to a work component 12 having an elongated T-shaped slot 32, the retention element 64 is generally L-shaped. Also, the leg portion 68 extending from an upper end of the upright portion 66 extends in a direction away from the first reference surface 44 of the accessory 10.

The above description also may be said to provide an example accessory 10 for connection to a work component 12 having an elongated central opening 32 to a T-shaped slot 24 and for use in aligning the work component 12 with a work piece WP. The example accessory 10 includes a body 38 having a first reference surface 44 extending upward from the body 38 and in a first direction, a retention element 64 extending upward and being spaced from the first reference surface 44 in a second direction. The accessory 10 also includes a clamp assembly 50 connected to the body 38 and having a fastener 56 extending in the second direction past the first reference surface 44, wherein the retention element 64 is generally L-shaped and further includes an upright portion 66 and a leg portion 68 extending from an upper end of the upright portion 66 in the second direction, and wherein the fastener 56 has a distal end and the clamp assembly 50 is movable to draw the distal end toward the first reference surface 44 of the accessory 10.

The clamp assembly 50 of the example accessory 10 includes a base 52 that is connected to the body 38, at least one biasing element 60 connected to the base 52 and the fastener 56, and the biasing element 60 biases the fastener 56 toward the base 52. It will be appreciated that the accessory may utilize at least one biasing element 60. The fastener 56 of the present example accessory 10 is a latch and the clamp assembly 50 further includes a lever 58 pivotally connected to the base 52, and the latch 56 is pivotally connected to the lever 58.

It will be appreciated that the accessory 10 of the example shown in FIGS. 1-9 is an alignment tool, and that the work component 12 shown is a guide rail for a track saw. In the example accessory 10 shown, the body 38 includes a work piece guide surface WP1 or WP 2 that extends at an angle relative to the first reference surface 44. The first reference surface 44 is provided by a wall 46 having a recess 80 near the bottom of the wall 46.

Figure 10:
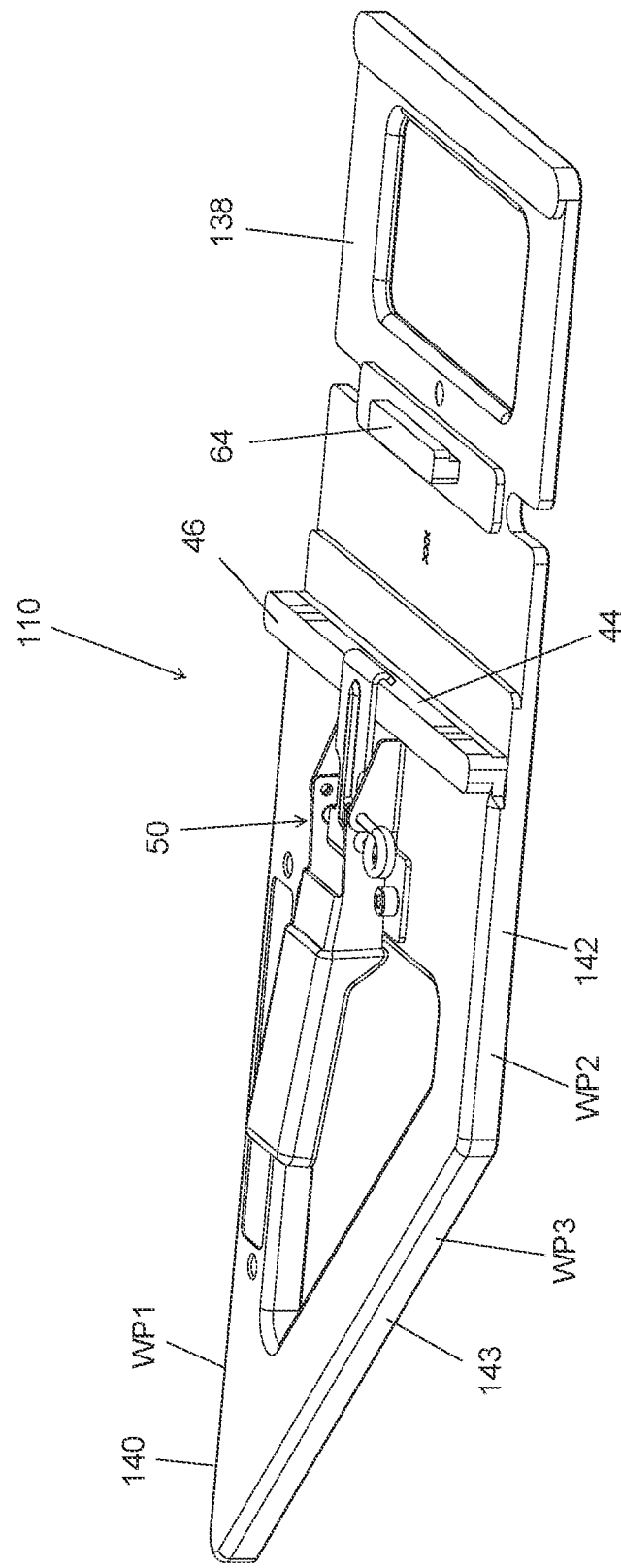
FIG. 10 is an upper perspective view of a second example accessory having an accessory mounting system for connection to a work component having an elongated T-shaped slot and a base having a different shape than the base of the first example accessory shown in FIG. 1.

Turning to FIG. 10, a second example accessory 110 is shown, which also is in the form of an alignment tool for connection to a work component. The second example accessory 110 is shown simply to provide an example wherein the body 138 may have, for example, parallel sides 140, 142 that provide respective work piece guide surfaces WP1, WP2, but also may provide an additional side 143, which is at an angle less than 90 degrees to one of the other sides 140, 142. This second example provides a simple way of providing yet a third work piece guide surface WP3, which may be used as a guide to cut a work piece WP at the prescribed angle. As previously noted, accessories may include structures to provide adjustability of the first reference surface 144 of the accessory 110, so as to be able to utilize the accessory at a plurality of different preselected angles for abutting engagement with a work piece WP. It will be appreciated that the second example accessory 110 includes the other features shown and described with respect to the first example accessory 10, such as the first reference surface 44 of the wall 46, the clamp assembly 50 and retention element 64, and therefore, the detailed description applies to the second example as well, and need not be repeated.

From the above disclosure, it will be appreciated that accessories and accessory mounting systems for connection of an accessory to a with work components having an elongated central opening to a T-shaped slot may be constructed in accordance with the present disclosure and may be provided in various configurations. Any variety of suitable materials of construction, configurations, shapes and sizes for the pieces of the accessories and methods of connecting the pieces may be utilized to meet the particular needs and requirements of an end user. It will be apparent to those skilled in the art that various modifications can be made in the design and construction of such accessories, as well as in the method of assembling an accessory to a work component, without departing from the scope or spirit of the claimed subject matter, and that the claims are not limited to the preferred embodiments and methods illustrated herein. The example accessories shown herein may exhibit one or more of the above-referenced potential advantages, depending upon the specific design chosen. It also will be appreciated that the example embodiments may be shown in simplified form, so as to focus on the key components and to avoid including structures that are not necessary to the disclosure and that would over complicate the drawings.

The invention claimed is:

1. An accessory mounting system for connection to and in combination with a work component having a bottom that includes a longitudinally extending elongated central opening to a T-shaped slot defined by opposed inward facing extensions of the T-shaped slot, the accessory mounting system comprising:
   a generally planar body;
   an L-shaped retention element having an upright connected to the body and a leg extending from an upper end of the upright and being spaced from and parallel to the body;
   a clamp assembly spaced from the L-shaped retention element and being connected to the body;
   a first reference surface extending upward from the body and in a first direction and being located between the L-shaped retention element and the connection of the clamp assembly to the body;
   the clamp assembly having a fastener extending past the first reference surface and toward the L-shaped retention element;
   wherein the L-shaped retention element upright and leg are sized to be inserted through the longitudinally extending elongated central opening to the T-shaped slot in the bottom of the work component at any preselected location along the longitudinally extending elongated central opening to the T-shaped slot when the bottom of the work component is moved in a direction normal to and into engagement with the body of the accessory mounting system; and
   wherein the clamp assembly moves the work component laterally into engagement with the first reference surface and simultaneously locates one of the inward facing extensions that form the T-shaped slot in a position that directly blocks the leg of the L-shaped retention element from removal through the longitudinally extending elongated central opening of the T-shaped slot, and spaces the L-shaped retention element away from vertical surfaces on the opposed inward facing extensions that define the central opening to the T-shaped slot and away from vertical surfaces inside the T-shaped slot;
   wherein the work component is removably fixed in a position laterally and longitudinally relative to the accessory mounting system.

2. The accessory mounting system for connection to and in combination with the work component in accordance with claim 1, wherein the leg extends from the upper end of the upright portion in a direction away from the first reference surface.

3. The accessory mounting system for connection to and in combination with the work component in accordance with claim 1, wherein the leg of the L-shaped retention element further comprises at least one chamfer that assists in guiding the retention element into the longitudinally extending elongated central opening to the T-shaped slot in the work component.

4. The accessory mounting system for connection to and in combination with the work component in accordance with claim 1, wherein the work component is able to be dropped vertically onto the accessory mounting system at any location along the work component, wherein the L-shaped retention element is inserted through the longitudinally extending elongated central opening to the T-shaped slot in the work component.

5. The accessory mounting system for connection to and in combination with the work component in accordance with claim 1, wherein the clamp assembly further comprises a base connected to the body.

6. The accessory mounting system for connection to and in combination with the work component in accordance with claim 5, wherein the clamp assembly further comprises a lever and the fastener is a latch that is connected to the lever.

7. The accessory mounting system for connection to and in combination with the work component in accordance with claim 6, wherein the lever is pivotally connected to the base and the latch is pivotally connected to the lever.

8. The accessory mounting system for connection to and in combination with the work component in accordance with claim 6, wherein the clamp assembly further comprises at least one biasing element that is connected to the base and the fastener.

9. The accessory mounting system for connection to and in combination with the work component in accordance with claim 1, wherein the work component further comprises a guide rail for use with a track saw.

10. The accessory mounting system for connection to and in combination with the work component in accordance with claim 1, wherein the accessory mounting system is part of an accessory that further comprises an alignment tool having at least one edge surface configured to abut a work piece while positioning the work component relative to a work piece.

11. The accessory mounting system for connection to and in combination with the work component in accordance with claim 10, wherein the alignment tool further comprises a guide rail square and the work component further comprises a guide rail for use with a track saw, wherein when the accessory mounting system of the guide rail square is clamped to the guide rail, the at least one edge surface of the guide rail square abuts an edge of the work piece and the guide rail extends across the work piece.

12. The accessory mounting system for connection to and in combination with the work component in accordance with claim 1, wherein the first reference surface further comprises an upstanding wall.

13. The accessory mounting system for connection to and in combination with the work component in accordance with claim 12, wherein the first reference surface further comprises a recess at the bottom of the wall.

14. The accessory mounting system for connection to and in combination with the work component in accordance with claim 1, wherein the body further comprises a work piece guide surface extending in a second direction which is at an angle to the first reference surface.

15. The accessory mounting system for connection to and in combination with the work component in accordance with claim 1, wherein the body further comprises at least one notch that extends inward from a side of the body and permits passage of a portion of a clamp.

16. A method of connecting an accessory to a work component having a longitudinally extending elongated T-shaped slot, the method comprising:
   placing an accessory on a flat surface, the accessory comprising a generally planar body, an L-shaped retention element connected to the body, a clamp assembly spaced from the retention element and being connected to the body, the L-shaped retention element comprising an upright and a leg extending from an upper end of the upright and parallel to the body, a first upstanding reference surface on the body and being located between the retention element and the connection of the clamp assembly to the body;

holding a work component in a selected location above the accessory, the longitudinally extending elongated T-shaped slot further comprising a central opening defined by spaced apart extensions, and having a first reference surface on an upstanding side wall of the work component;

lowering the work component onto the accessory at any location along a length of the work component, wherein the retention element upright and leg of the accessory are inserted into the longitudinally extending T-shaped slot through the elongated central opening of the work component; and engaging the clamp assembly, wherein the work component is moved laterally relative to the longitudinally extending elongated T-shaped slot to a location wherein the first upstanding reference surface on the body of the accessory abuts the first reference surface on the upstanding side wall of the work component, and wherein the leg portion of the retention element underlies one of the extensions that defines the central opening of the elongated T-shaped slot, blocking withdrawal of the L-shaped retention element from the longitudinally extending T-shaped slot, and wherein the L-shaped retention element is spaced away from vertical surfaces on the spaced apart extensions that define the central opening to the T-shaped slot and away from vertical surfaces inside the T-shaped slot, and wherein the work component is removably fixed in a position laterally and longitudinally relative to the accessory.

17. The method in accordance with claim 16, wherein the leg extending from an upper end of the upright of the L-shaped retention element extends in a direction away from the first upstanding reference surface of the accessory.

18. An accessory for connection to a work component having an elongated central opening to a longitudinally extending T-shaped slot, wherein elongated central opening to the T-shaped slot is defined by opposed inward facing extensions of the T-shaped slot, and for use in aligning the work component with a work piece, the accessory comprising:

a body having a first reference surface extending upward from the body and in a first direction;

an L-shaped retention element extending upward and being spaced from the first reference surface in a second direction;

a clamp assembly connected to the body and having a fastener extending in the second direction past the first reference surface;

wherein the L-shaped retention element further comprises an upright and a leg extending from an upper end of the upright in the second direction; and wherein the fastener has a distal end and the clamp assembly is movable to draw the distal end toward the first reference surface of the accessory while drawing a portion of a T-shaped slot over the leg of the L-shaped retention element and spacing the L-shaped retention element away from vertical surfaces on the opposed inward facing extensions that define the central opening to the T-shaped slot and away from vertical surfaces inside the T-shaped slot, so as to prevent disconnection of the work component from the accessory.

19. The accessory in accordance with claim 18, wherein the clamp assembly further comprises a base that is connected to the body, at least one biasing element that is connected to the base and the fastener, and the biasing element biases the fastener toward the base.

20. The accessory in accordance with claim 18, wherein the fastener is a latch and the clamp assembly further comprises a lever pivotally connected to the base, and the latch is pivotally connected to the lever.

21. The accessory in accordance with claim 18, wherein the accessory is an alignment tool having at least one edge surface configured to abut a work piece while positioning the work component relative to a work piece.

22. The accessory in accordance with claim 18, wherein the work component is a guide rail for a track saw.

23. The accessory in accordance with claim 18, wherein the body further comprises a work piece guide surface that extends at an angle relative to the first reference surface.

24. The accessory in accordance with claim 18, wherein the first reference surface further comprises a wall having a recess at the bottom of the wall.

\* \* \* \* \*